(12) United States Patent  
Amacker et al.

(10) Patent No.: US 9,875,342 B2  
(45) Date of Patent: Jan. 23, 2018

(54) DYNAMIC BARCODE GENERATION FOR CONTENT LOCATION

(71) Applicant: A9.com, Inc., Palo Alto, CA (US)

(72) Inventors: Matthew W. Amacker, Santa Clara, CA (US); Stephen S. Tompkins, San Jose, CA (US)

(73) Assignee: A9.com, Inc., Palo Alto, CA (US)

( * ) Notice: Subject to any disclaimer, the term of this patent is extended or adjusted under 35 U.S.C. 154(b) by 45 days.

(21) Appl. No.: 14/990,643

(22) Filed: Jan. 7, 2016

(65) Prior Publication Data

US 2016/0117487 A1   Apr. 28, 2016

Related U.S. Application Data

(63) Continuation of application No. 13/181,261, filed on Jul. 12, 2011, now Pat. No. 9,240,058.

(51) Int. Cl.
*G06F 21/10* (2013.01)
*G06T 11/00* (2006.01)
(Continued)

(52) U.S. Cl.
CPC ........ *G06F 21/10* (2013.01); *G06F 17/30876* (2013.01); *G06K 7/1408* (2013.01);
(Continued)

(58) Field of Classification Search
CPC ........ G06Q 30/06; G06Q 20/40; G06Q 20/18; G06Q 20/3274; G06Q 40/04; Y10S 707/99931; Y10S 707/99939; Y10S 707/99932; G06F 17/602; G06F 17/30011; G06F 21/10; G06F 3/0686; G06F 17/30725; G06F 2221/213; G06F 17/30017; H04L 65/4084; H04N 2201/3246; H04N 1/4413;
(Continued)

(56) References Cited

U.S. PATENT DOCUMENTS

2007/0233612 A1   10/2007   Barrus et al.
2008/0141117 A1   6/2008   King et al.
(Continued)

OTHER PUBLICATIONS

"Non Final Office Action dated Mar. 6, 2014" received in U.S. Appl. No. 13/181,261.
(Continued)

*Primary Examiner* — Haixia Du
(74) *Attorney, Agent, or Firm* — Hogan Lovells US LLP

(57) ABSTRACT

A user can share digital content with another user or device using dynamically-generated barcodes. A user might request to share an electronic book ("e-book"), stored on a first device, with another user having a second device. The first device can generate a barcode that includes not only information about the identity of the e-book, but also information about the user or the first device, which can help to determine rights and/or access restrictions for the content. The second device can capture an image of the barcode generated on a display of the first device, and use information extracted from that image to attempt to obtain a copy of the e-book. Other types of barcodes can be generated based at least in part upon the context, such as where a user is attempting to locate a physical copy of a type of digital content in a retail location.

20 Claims, 6 Drawing Sheets

(51) Int. Cl.
  *G06T 11/20* (2006.01)
  *G06F 17/30* (2006.01)
  *G06K 7/14* (2006.01)
  *G06K 19/06* (2006.01)

(52) U.S. Cl.
  CPC ...... *G06K 7/1443* (2013.01); *G06K 19/06112* (2013.01); *G06T 11/00* (2013.01); *G06T 11/206* (2013.01); *G06F 2221/0731* (2013.01)

(58) Field of Classification Search
  CPC ... H04N 2201/3205; H04N 2201/3236; G06K 7/1447; G06K 7/1417; G06K 19/06028; G06K 7/1413; G06K 7/143; G06K 7/1443
  See application file for complete search history.

(56) References Cited

U.S. PATENT DOCUMENTS

| | | | | |
|---|---|---|---|---|
| 2008/0155614 | A1* | 6/2008 | Cooper | G06F 21/10 725/91 |
| 2010/0187311 | A1 | 7/2010 | van der Merwe et al. | |
| 2011/0176705 | A1 | 1/2011 | Kato | |
| 2011/0038552 | A1 | 2/2011 | Lam | |
| 2012/0298737 | A1* | 11/2012 | Thakar | G06Q 30/0621 235/375 |
| 2012/0308003 | A1 | 12/2012 | Mukherjee | |

OTHER PUBLICATIONS

"Final Office Action dated Sep. 18, 2014" received in U.S. Appl. No. 13/181,261.

"Non Final Office Action dated Dec. 31, 2014" received in U.S. Appl. No. 13/181,261.

"Final Office Action dated Jun. 2, 2015" received in U.S. Appl. No. 13/181,261.

"Notice of Allowance dated Sep. 3, 2015" received in U.S. Appl. No. 13/181,261.

* cited by examiner

DYNAMIC BARCODE GENERATION FOR CONTENT LOCATION

CROSS-REFERENCES TO RELATED APPLICATIONS

This application is a continuation of U.S. application Ser. No. 13/181,261, entitled "DYNAMIC BARCODE GENERATION FOR CONTENT LOCATION," filed Jul. 12, 2011; which is incorporated herein by reference for all purposes.

BACKGROUND

As the popularity of electronic books and other types of electronic media is increasing, there is an increasing desire to improve the ways in which media such as electronic book ("e-book") content is managed. For example, a person might want to obtain a copy of an electronic book that another person is reading. Using conventional approaches, the person wanting a copy must manually enter information for the e-book into an electronic device, or the person having the book can locate and send a URL from which the book can be obtained. Either approach can be somewhat time consuming, particularly where the manual entry or searching is done on a small mobile device that requires a user to select small virtual keys on a touch screen. Even in cases where a person owns a sharable copy of an e-book, that person generally must obtain and manually enter an email address or other identifier in order to provide that copy to the other person. If a copy is to be shared with multiple persons, the process becomes even more time consuming.

BRIEF DESCRIPTION OF THE DRAWINGS

Various embodiments in accordance with the present disclosure will be described with reference to the drawings, in which.

DETAILED DESCRIPTION

Figure 1:
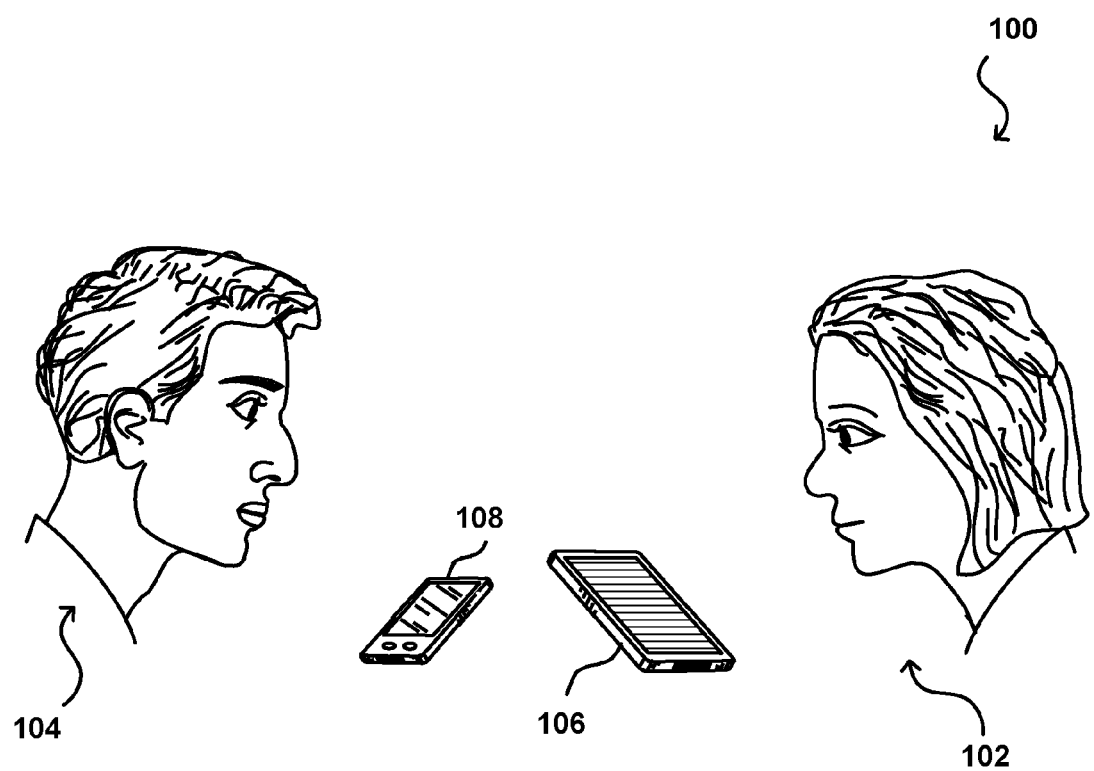
FIG. 1 illustrates an example situation where two people want to share content between their respective devices in accordance with various embodiments.

Systems and methods in accordance with various embodiments of the present disclosure may overcome one or more of the aforementioned and other deficiencies experienced in conventional approaches to locating and/or obtaining content. In particular, various embodiments provide for the ability to share, locate, and/or obtain various types of digital content using dynamically generated barcodes. Based at least in part upon a type of content, an identification of specific content, and/or an intended result with respect to that content, at least one barcode can be generated and displayed on a display element of an electronic device. Another electronic device capable of imaging or scanning that barcode can determine at least the identity of the content and perform one or more appropriate actions with respect to that content.

In one embodiment, a first user of a first device might want to share an object of digital content, such as an electronic book ("e-book"), a multimedia file, a video game, a virtual good (e.g., a digital item used in a game or other electronic environment), or another such object, with a second user having a second device. The first user can indicate to the first device that the first user wants to share the content with another user. The first device can determine an appropriate identifier for that content, and can generate a barcode from which the identifier can be decoded. For types of content such as e-books where there can be access and/or ownership rights, for example, the barcode can also include information identifying the first user, information identifying the first device, a type of right or license associated with the e-book, and the like. The barcode can be displayed on an appropriate display element of the first device. The second user can cause the second device, in at least some embodiments, to capture an image of at least a readable portion of the barcode using an image capture element, such as a digital still or video camera of a portable computing device. The second device can decode or otherwise extract various information from the barcode, and attempt to obtain a copy of the e-book. If the second user is able to access a copy of the e-book on the second device within rights granted to the first user, for example, the second user can download or otherwise obtain a copy of the e-book. If the second user does not have such access rights, the second device can present the second user with an option to purchase or otherwise obtain a copy of the e-book using the identifying information obtained from the first user via the barcode. Such an approach enables information to be shared without significant manual entry, navigation, or other such tasks or actions.

In some embodiments, a user might want to locate a physical copy of a digital object, such as an e-book, digital album of music, video file, etc. In at least some embodiments, the user can cause a device with access to information identifying that file to generate a barcode including identifying information. In this example, the barcode might not include information identifying the user, such as where a conventional barcode reader is being used in a library to locate a physical copy of the book to check out. In other embodiments, such as where the user is at a book store, the barcode might include other information, such as account information or book club information, which can cause the physical book to be automatically charged to the user's account, added to a loyalty program list, etc. In some embodiments, the user can then pick up the book without having to stand in line to pay for the book, as the account information has already been sent such that the retailer can receive payment.

Various other applications, processes and uses are presented below with respect to the various embodiments.

FIG. 1 illustrates an example environment 100 wherein a first user 102 is operating a first computing device 106. In this example, the first electronic device 106 is storing a copy of an electronic book that was purchased, or otherwise obtained, by the first user 102. The first user may wish to share that electronic book with a second user 104 having a second computing device 108. Using conventional approaches, the first user would have to provide a link to a location from which the book could be obtained, the second user would have to manually enter or search for information for the book, or a similar process would have to be undertaken typically requiring a number of steps or minimum amount of manual entry. In this example, however, the users can take advantage of the fact that the first device 106 has a display screen (e.g., an LCD or e-ink display) and the second device 108 has at least one image capture element (e.g., a digital camera element). If the first device is capable of displaying an element such as a barcode that includes information associated with the book, the second device can capture an image of that barcode and, upon extracting the information from the barcode, obtain a copy of that e-book from an appropriate source.

Figure 2A:
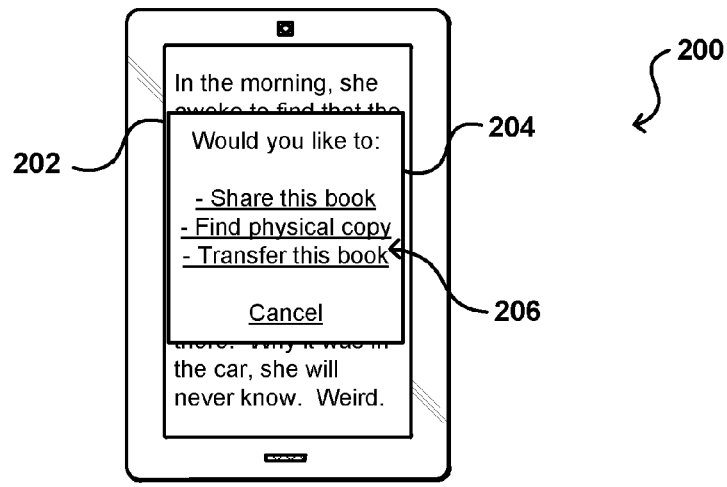
FIGS. 2(a), (b), and (c) illustrate example situations where different types of barcodes can be generated and used for different purposes in accordance with various embodiments.

In one example, FIG. 2(a) illustrates an example situation 200 wherein a user is reading (or otherwise accessing information for) an electronic book on a display element 202 of a computing device. If the user wants to perform an action with respect to that e-book, the user can select one or more options that can cause at least one interface element 204 to be displayed that can enable the user to specify the action to be performed. In this example there are multiple user-selectable options 206 displayed, such as to enable sharing of that book with another user or device, locate a physical copy of the book, or transfer the copy to another user or device, although various other and/or additional options could be presented as well within the scope of the various embodiments.

Figure 2B:
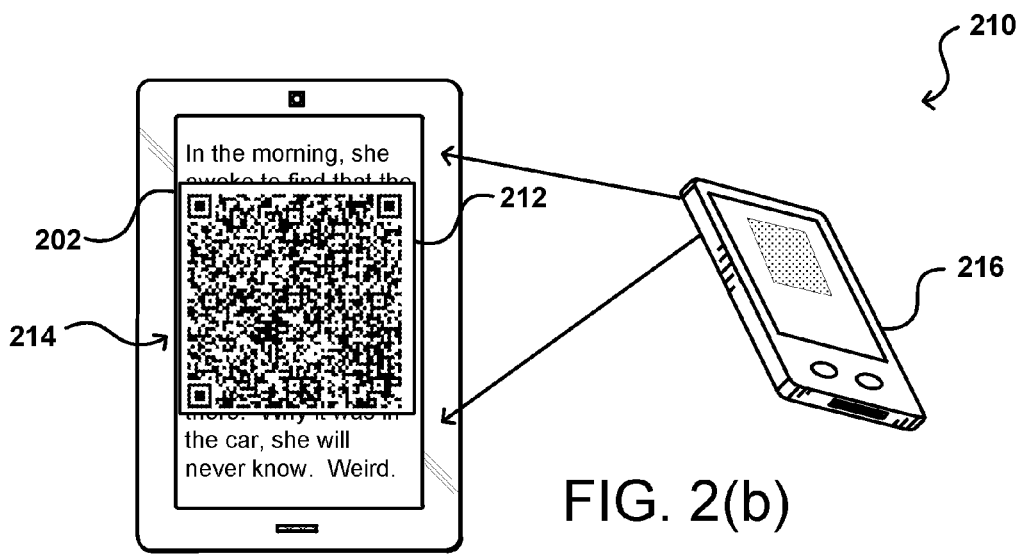

The computing device can take different actions based at least in part upon the option that the user selects. For example, FIG. 2(b) illustrates an example situation 210 wherein a user of the computing device indicates an intention to share the e-book with another user or device. In many instances, an e-book (or other digital object) will be subject to various copyright and/or use licenses and/or restrictions. It thus can be important in at least some embodiments to provide information enabling compliance with these licenses and/or restrictions. In at least some embodiments the computing device can store information and/or determine information (i.e., by contacting a source from which the content was obtained) about the ability to share the book with another user or device when the user selects an option to share the content. In other embodiments, the computing device can provide information enabling another user or device to determine the ability to access or obtain a copy of that device.

In this example, the computing device determines information identifying the e-book, such as may include a UPC code, retailer-specific item number, and the like. The computing device also can determine information identifying the user and/or device corresponding to the current copy. For example, a user might have a user identifier or account number with a particular retailer. Using information such as the content identifier and owner account number, the computing device can generate an appropriate barcode 214 to be displayed on a display element of the computing device, as illustrated in the example situation 210 of FIG. 2(b). In this example, the amount of information might be too much to include in a traditional line-based barcode, such that a matrix code 212, QR code, or other appropriate barcode format can be used.

Once the barcode is generated and rendered for display on the display screen 202 of the computing device, an image of that barcode can be captured by an image capture element of another device 216, which will be referred to herein as an "electronic device" in order to differentiate the two devices, but should not be interpreted as indicating that both devices cannot be the same type of device. This electronic device can be another device owned or used by the same user, or can correspond to a different person. The electronic device 216 can capture an image of the barcode, and either analyze the barcode image or upload the image to a remote system or service for analysis. During the analysis, the information identifying the content can be determined, as well as the information identifying the user, computing device, or other entity associated with the copy on the computing device.

In at least some embodiments, the electronic device 216 is able to submit a request to a provider of the type of content, as may be determined from the barcode information as well, that includes information identifying the content and the user or device attempting to share the content. A remote system or service can analyze any rights or use information for the content with respect to the user of the computing device, such as a type of license purchased, as well as for the content itself, such as whether the content is public domain or has a certain type of use restriction. Similarly, the request can also include information about the user and/or electronic device 216 attempting to obtain a copy, such as where the user might have an account with a retailer granting at least a certain amount of access to certain types of content. If the user of the electronic device is able to obtain a copy of the content, the electronic device 216 can obtain a copy, such as by downloading from a network source or transferring directly from the computing device over a wireless connection. If the user and/or electronic device does not have the right to access or obtain a copy, the electronic device can provide information (e.g., a link or Web page) enabling the user to purchase or otherwise obtain the rights to a copy of that content.

In at least some embodiments, the computing device can also determine information corresponding to a current state of, or location in, the content on the computing device, such as a current page or paragraph the user is on, a current location in a video or audio file, a current level in a game, etc., and can include this information in the dynamically-generated barcode. Such an approach enables the electronic device to not only obtain a copy of the content, but also present the same location or state of the content as is currently active on the computing device. In other embodiments, at least a portion of the content may still be visible on the display screen even when the barcode is displayed, as in FIG. 2(b). In such an instance, the electronic device (or a system or service in communication with the electronic device) can perform one or more image analysis processes, as may include optical character recognition (OCR) or pattern matching, to attempt to determine a current location or state of the content, which then can be located on the electronic device after obtaining the content. Various other approaches can be used as well within the scope of various embodiments.

Figure 2C:
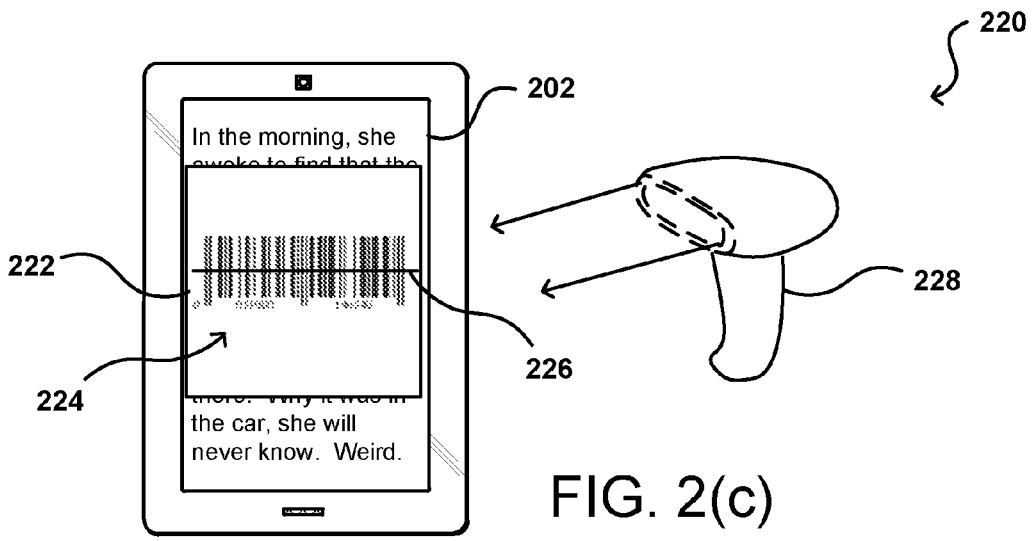

FIG. 2(c) illustrates a different example situation 220 where a user is attempting to locate a physical copy of an e-book, such as when the user is in a library or book store. In this example, where the user has selected an option to locate a physical copy of a book, the barcode generated 224 on an interface element 222 might only include information identifying the book, and might have a more conventional one-dimensional format, etc. Thus, a conventional barcode scanner 228 or other such device can potentially scan the barcode, such as by using a scanline 226 based process as known in the art, to determine whether there is an available copy of that book and, if so, where that physical copy might be located. Methods for checking inventory or stock based on a product identifier are well known in the art and, as such, will not be discussed herein in detail.

As mentioned, however, there might still be some advantage to including user- or device-identifying information in this barcode display as well. For example, if the barcode includes the user's library account, the copy can be automatically checked out to the user so no other person can check out the book before the user gets to it. If the user is in a bookstore and has an account with the bookstore, the user can setup auto-purchase or other such options where the user does not have to stand in a checkout line, might have points for the purchase automatically credited to the account, etc.

In some cases, a barcode imaging process might not provide acceptable results due at least in part to some aspect of the barcode and/or captured image. In at least some embodiments, the matching process can include one or more variations or additional steps to attempt to find a match while accounting for a number of potential aspects or issues with the captured information. For example, the recognition and/or analysis process might perform additional steps to attempt to handle other barcode formats, such as UPC-E or EAN-8. The process also might attempt to correct for any noise in a central set of rows or other portion of the image, such as where there were specular reflections in the captured image. Various example approaches for analyzing a barcode are provided in co-pending U.S. patent application Ser. No. 13/095,230, filed Apr. 27, 2011, and entitled "Decoding Barcodes," which is hereby incorporated herein by reference.

Figure 3A:
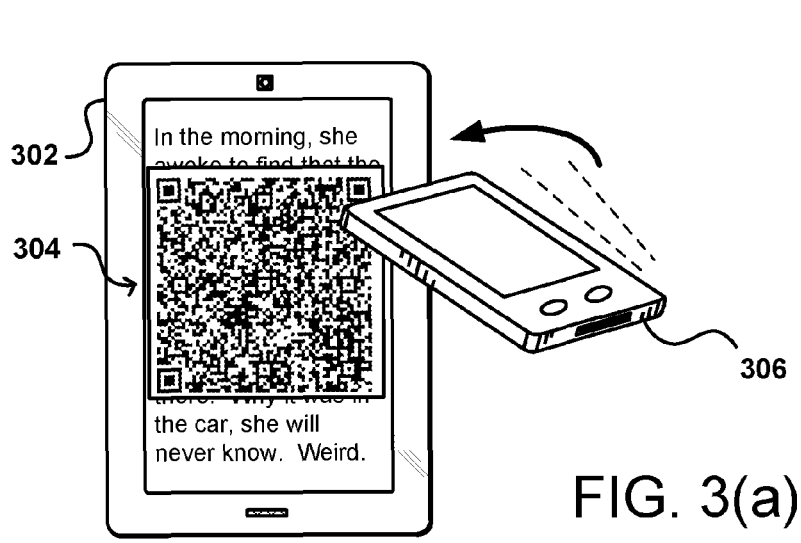
FIGS. 3(a), (b), and (c) illustrate examples of a barcode digit being processed to form a template in accordance with various embodiments.

In embodiments where a user might have an application or process executing on a computing device, the sharing of content can be further simplified. For example, FIG. 3(a) illustrates an example situation 300 where a computing device 306 is executing an application, such as an e-book reader. The e-book application can be active or running in the background, etc. In this example, the application can be programmed to attempt to "grab" a copy of a book when the device on which the application is running is "tapped" against another device. In this example, the computing device 306 can include at least one motion determining element, such as an accelerometer or inertial sensor, that can determine when the device is "tapped" against something, such as where there is a quick change in direction, and possibly some vibration or other action resulting from the tap. In this example, the computing device 306 is tapped against another computing device, in this example a tablet computer 302. When the computing device 306 is tapped against the tablet computer 302, the computing device can detect the tap and provide corresponding input to the application.

Figure 3B:
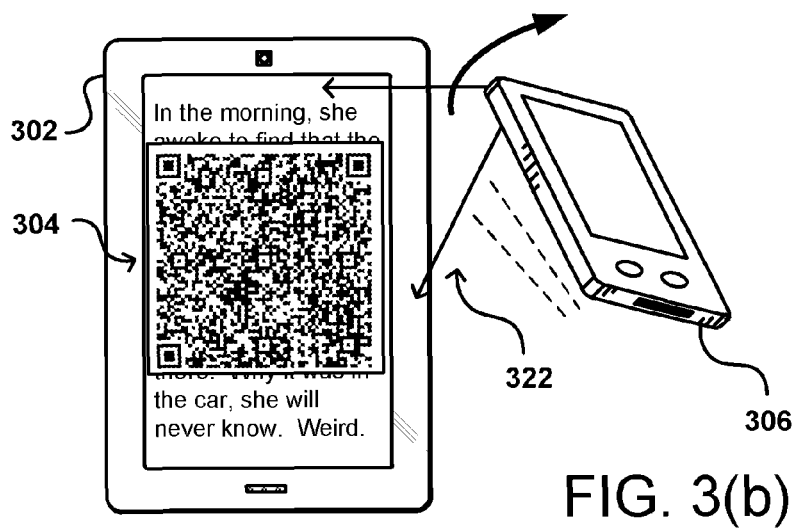

In this example, a barcode 304 can be displayed on the tablet computer 302 as discussed elsewhere herein. This barcode can be generated using any appropriate approach discussed or suggested herein, and can be triggered manually by the user, as a result of the tapping action, etc. As illustrated in the situation 320 of FIG. 3(b), after the tap the computing device will be a distance away from the tablet computer 302. Assuming the computing device 306 is tapped against the tablet such that at least one imaging element of the computing device is facing at least substantially towards the display of the tablet computer within a viewable range 322 of that imaging element, the computing device 306 can automatically capture one or more images after the tap in order to attempt to capture at least one image showing the barcode with sufficient clarity. Such an approach can enable the computing device to capture an image of the barcode without the user having to open up a camera application, take a picture, navigate to the picture, upload to a source, and/or perform any other such step that might be required with various other approaches. Further, the capture and upload can be performed automatically, based upon the user "tapping" his or her device to the device with the object to be shared.

Figure 3C:
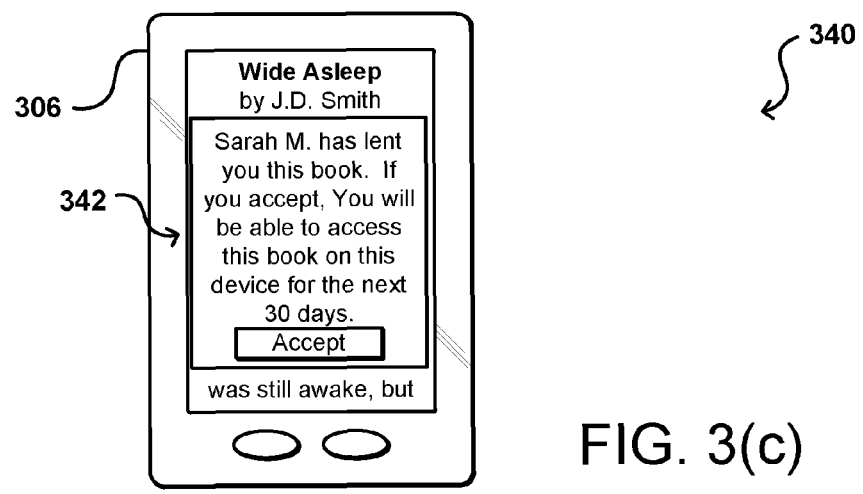

If an image of the barcode is successfully captured and analyzed, a copy of the content can be automatically downloaded (or uploaded) to the device in at least some embodiments. In the situation 340 of FIG. 3(c), a message 342 is generated for the user indicating that the share was successful. In this example, the user is prompted to accept the terms of the sharing or use, such as a period of the sharing before access rights will expire. Various other messages, notifications, or agreements can be provided as well within the scope of the various embodiments.

Figure 4:
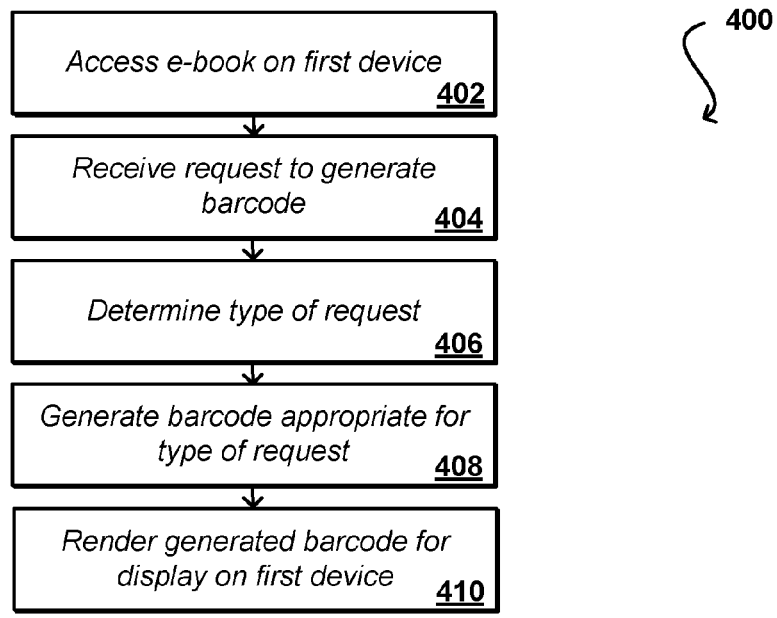
FIG. 4 illustrates an example process for rendering an appropriate barcode image that can be used in accordance with various embodiments.

FIG. 4 illustrates an example process 400 for rendering a situation-specific barcode that can be used in accordance with various embodiments. It should be understood that there can be additional, fewer, or alternative steps performed in similar or alternative orders, or in parallel, within the scope of the various embodiments unless otherwise stated. In this example process, a digital object, such as an e-book, is accessed on a first device 402. In some embodiments, the user need not actually access the object, but can access information associated with, or at least identifying, the object. A request can be received from a user, application, or other such source to generate a barcode for the object 404. As discussed elsewhere herein, the request can correspond to an intent to share, lend, locate, or otherwise perform an action with respect to a copy or instance of the object. The type of request can be determined 406, and a barcode can be generated 408 that is appropriate for the type of request. As discussed, one type of barcode might be generated when the content is to be shared with another users 410, while another type of barcode might be generated if the user is attempting to locate a physical copy of an object. In some embodiments, the type of barcode might be the same but the type of information contained in that barcode can be different as discussed.

Figure 5:
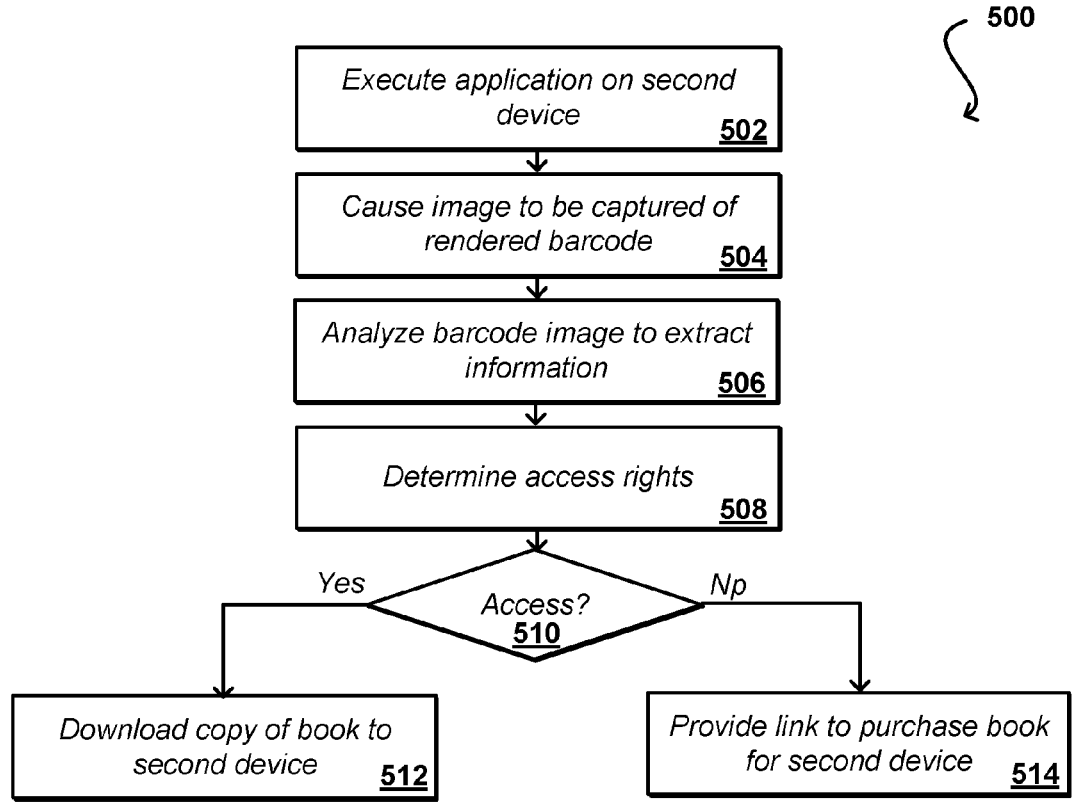
FIG. 5 illustrates an example process for obtaining content based on a analyzing a barcode image that can be used in accordance with various embodiments.

FIG. 5 illustrates an example process 500 for obtaining a copy of the content on a second device that can be used in accordance with various embodiments. In this example, an application is executed on the second device 502. As discussed, this could be an e-book application, a media player, or even a camera control application, etc. At least one image of a rendered barcode, such as might be presented on a first device using a process similar to that discussed with respect to FIG. 4, can be triggered to be captured using an image capture element of the second device 504. As mentioned, the image capture can be triggered manually by a user, as a result of an application, or as a result of a tap or other such motion of the second device. The captured barcode image(s) can be analyzed to extract information useful for obtaining a copy of the content 506, which can include information such as a content identifier, identifying information for the first device or a user of that device, etc. In this example where the content is to be shared, one or more access rights to the content can be determined 508, either locally on the second device or by sending information to a remote system or service over a network. As discussed, the access determination can also utilize identifying information about the second device and/or a user of the second device. A determination is made as to whether the second device has access to obtain a copy of the content 510, and if so the second device can download 512 a copy of the content (e.g., e-book) to the second device. If the second device does not have access rights, another appropriate action can be taken such as to provide a link or page enabling a user of the second device to purchase rights to a copy of that content 514. Various other approaches can be used as well as discussed elsewhere herein.

In at least some embodiments, users do not have be in physical proximity in order to share information. For example, a device generating a barcode can cause that barcode to be emailed, printed out, faxed, or otherwise presented to another user or device. In cases where account or user identifying information is included, the providing of a dynamic barcode can still enable sharing of content that a user might not be able to otherwise obtain from a particular source. In some cases where the users are talking over a Webcam connection, for example, a user can hold a barcode up to a Webcam such that the computer at the other end can extract the barcode, or a user can take a picture of that barcode as displayed on the computer screen.

Another advantage of including user identifying or account information in a barcode is that the user might get benefits for promoting a certain type of object. For example, if a user shares a book with ten other people, and at least some of them end up buying the book or a related item, that user might get promotional credit, points, or another such reward. Further, since users might not be able to tell that device identifying information is included in the barcodes, the inclusion of such information can help to track down or locate stolen devices.

As discussed, the type of access to content can vary upon situation, type of sharing, access limits, and the like. In some embodiments, a shared version can be made to expire after a certain amount of time. In other embodiments, an object shared with another user might not be able to be accessed by the original owner until the item is no longer being shared. In some embodiments, a user can "transfer" or "give" a copy of the content to another user or device. These terms are in quotation marks because the other user or device would likely download the copy from a third party source or obtain the content from the original owner's device, but the original owner's copy would be deleted upon the second device obtaining the content. Such an approach can help to comply with single-copy licenses, particularly where a user is upgrading a device, etc. In some embodiments where the identifying information (e.g., a user account number with a content provider) is included in the barcode, and where content rights enable such usage, the identifying information can be used to cause a user of the first device to be compensated for transferring the content to the user of the second device. This enables a user to "resell" the object to another user, or at least be compensated for assisting a second user in purchasing that content. In some embodiments, only a source or owner of the content might be compensated, the first user might receive points or other virtual goods while the source is compensated, or the first user and source of the content might split some amount of the compensation. Various other approaches can be utilized as well as should be apparent to one of ordinary skill in the art in light of the present disclosure.

In some embodiments, a user might use the barcode with another device not to obtain another copy, but to access supplemental content or other versions of that material on another device. For example, a user might be reading an e-book on an e-book reader with a monochromatic e-ink display. If there is supplemental video content, the user might want to access that content on a home computer or other such device without having to manually enter or search for the information, etc. If the user can take a picture of the barcode, the user can enable the supplemental content to be accessed on another device, such as where the user can access the full color video at a higher frame rate. Such an approach can also help to ensure that people accessing the supplemental content have also actually purchased or otherwise legally obtained a copy of the corresponding content. In some embodiments, the supplemental content can be provided by a retailer or electronic marketplace from which the corresponding object was obtained, while in other embodiments the supplemental content can come from a manufacturer, producer, or other provider of the original object. For example, a booklet for an audio file can be provided by the retailer or the studio or label producing the audio file.

In some embodiments, the dynamic nature of the barcodes can be used to provide other information as well. For example, a barcode can including information about a current page, section, or location in a book; a particular song in an audio collection; a particular scene in a video file; and any other appropriate portion or section of a digital object as discussed herein. Such an approach can enable multiple users or devices to quickly locate the same information, such as may be useful in a classroom setting so that all students navigate quickly and/or automatically to the same math problem. If a user has multiple devices, the user can use this approach to pick up at the same location on another device, such as to transfer a file from a mobile device to a higher capacity device when the user arrives home. Similarly, if the user borrows a device such as a book reader or tablet PC, the user can capture a copy of the barcode (by printing, screen capture, etc.) and then use that barcode to resume at the same place when subsequently borrowing a device, even if it is a different device. For instructional books, barcodes can be used to direct a computing device to render an image or navigate to a page on a Web site that will be discussed in that section. In some cases, macros could be executed on a computing device based on the dynamically generated barcode to display a series of commands or actions to a user.

Barcodes also can be generated that include identifiers for multiple content objects. For example, a user might want to share several books on a given topic, songs by a similar artist, movies with a common actor, etc. In at least some embodiments, the user can designate the various items and then cause a barcode to be generated that can be used by another user or device to obtain the various items. In a school setting, for example, each student could get a single barcode that would cause all the necessary books for all of the classes for that particular student for that semester to be automatically downloaded to their device.

In some embodiments, a barcode can be used to obtain related or similar items or objects. For example, if a user likes a book the user can take a picture of the barcode to obtain a list of related items that the user can borrow. If the user is on a different type of device, the user might receive the ability to purchase a version of that content for that device, such as a movie version of a book for display on a tablet computer using a barcode for an e-book version read on an e-book reader. A user might also be able to obtain older versions, remakes, special editions, etc. If a content object is no longer available, one or more alternatives might be provided.

In at least some embodiments, certain steps of the various processes can be repeated if a capturing device is unable to analyze a particular format. In some embodiments, a process can first be run for a most common barcode format, and then can be re-run for each of a number of other less common formats until a match is found or it is determined that the image cannot be decoded. In other embodiments, certain steps of the process can be performed multiple times for different formats, such that the entire process does not have to be repeated in sequence for each potential format until a match is found. Similarly, when favorable results cannot be obtained using a given scanline or image, additional scanlines or images can be analyzed for the same barcode. These additional attempts can be done serially, or multiple versions can be analyzed at the same time in order to decrease the average result time, although such an approach would also increase the average amount of resources needed to find a result. Fortunately, the processes described herein can be performed quickly, such that multiple variations of a barcode decoder can be executed concurrently in order to attempt to capture any anticipated variation. Various combinations of the processes can be utilized for each incoming image to attempt to obtain the most accurate barcode results. In some embodiments, barcodes of multiple formats can be displayed concurrently, or serially, in an attempt to improve the transfer of the barcode information.

In at least some embodiments, content displayed on a computing device can include a watermark as known or used in the art, which can be virtually undetectable to the human eye but detectable by various image capture devices. In at least some embodiments, information identifying a source of the content might be embedded in the watermark, which can be used with the generated barcode information to assist in determining access rights, locating a copy of the content, etc. For example, the watermark might include information identifying a location from which the content can be obtained. Such information can be captured by a second device when capturing an image of a dynamically-generated barcode, or in some embodiments can be analyzed by the computing device such that the source information can be added to the information of the barcode, such as where there is not enough real estate on the display to concurrently render both the generated barcode and the watermark. Various other processes known for identifying a source of content, a type of access rights, or other such information can be embedded in the content as well, such as by slightly altering a type face, adding additional encoded information, etc.

In some embodiments, the barcode that is dynamically rendered by the computing device can take a different form, such as may be presented as a watermark or other type of code or image. For example, identifying information for an instance of content and a current owner of that instance can be used to dynamically generate a watermark barcode that might not be noticeable by the owner, but could be detected by an electronic device attempting to capture an image to obtain the content. In another example, the information could be used to render a light gray coded image that might run along a top, bottom, or side of the screen, or diagonally, etc., which can enable the owner to still view the content while another user or device is attempting to obtain the information. Such an approach can be particularly useful for movies or other types of streaming content, among others.

Figure 6:
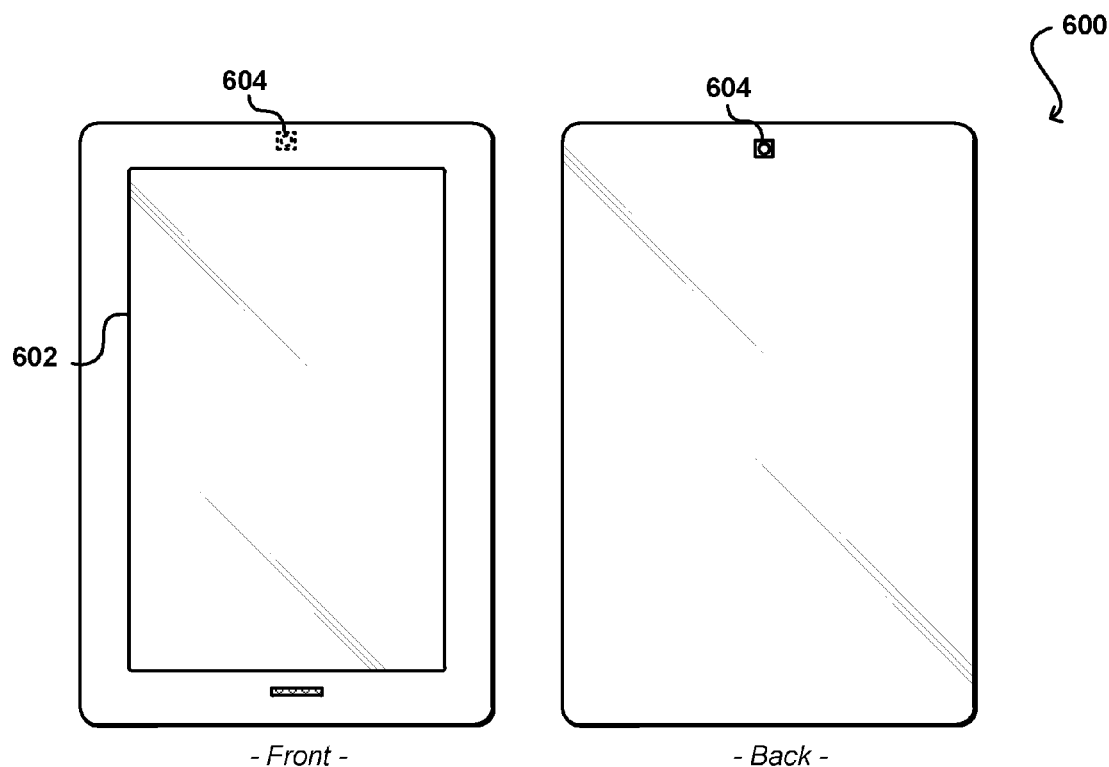
FIG. 6 illustrates front and back views of an example device that can be used in accordance with various embodiments.

FIG. 6 illustrates an example of a computing device 600 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602, which under normal operation will display information to a user facing the display screen (e.g., on the same side of the computing device as the display screen). The computing device in this example can include one or more image capture elements, in this example including one image capture element 604 on the back side of the device, although it should be understood that image capture elements could also, or alternatively, be placed on the sides or corners of the device, and that there can be any appropriate number of capture elements of similar or different types. Each image capture element 604 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 7:
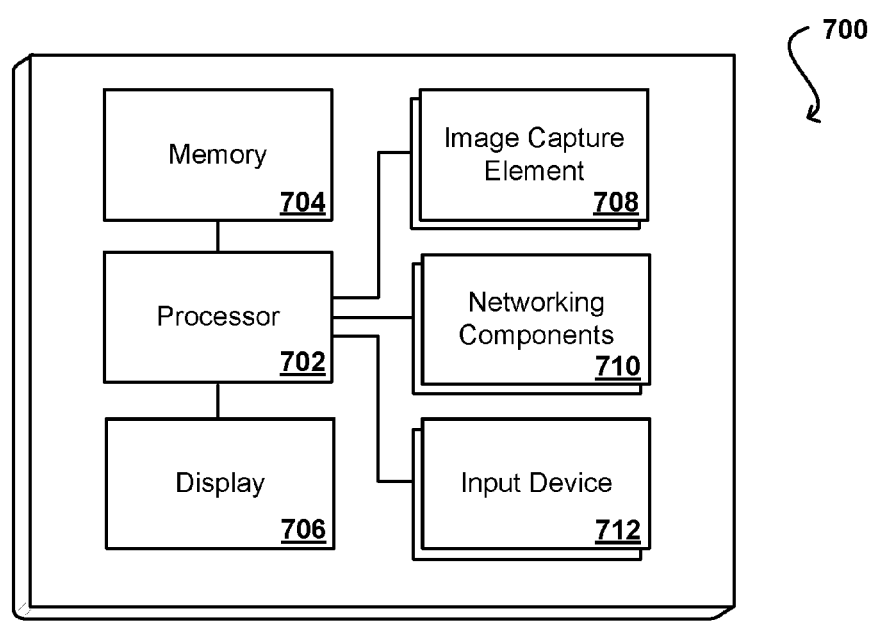
FIG. 7 illustrates an example configuration of components of a device such as that described with respect to FIG. 6.

FIG. 7 illustrates a set of basic components of a computing device 700 such as the device 600 described with respect to FIG. 6. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the processor 702, the same or separate storage can be used for images or data, a removable memory can be available for sharing information with other devices, and any number of communication approaches can be available for sharing with other devices. The device typically will include some type of display element 706, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 708, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 710 enabling the device to communicate with remote systems or services such as content providers and rights determining systems. These components can include, for example, wired or wireless communication components operable to communicate over a network such as a cellular network, local area network, or the Internet. The device can also include at least one additional input device 712 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 8:
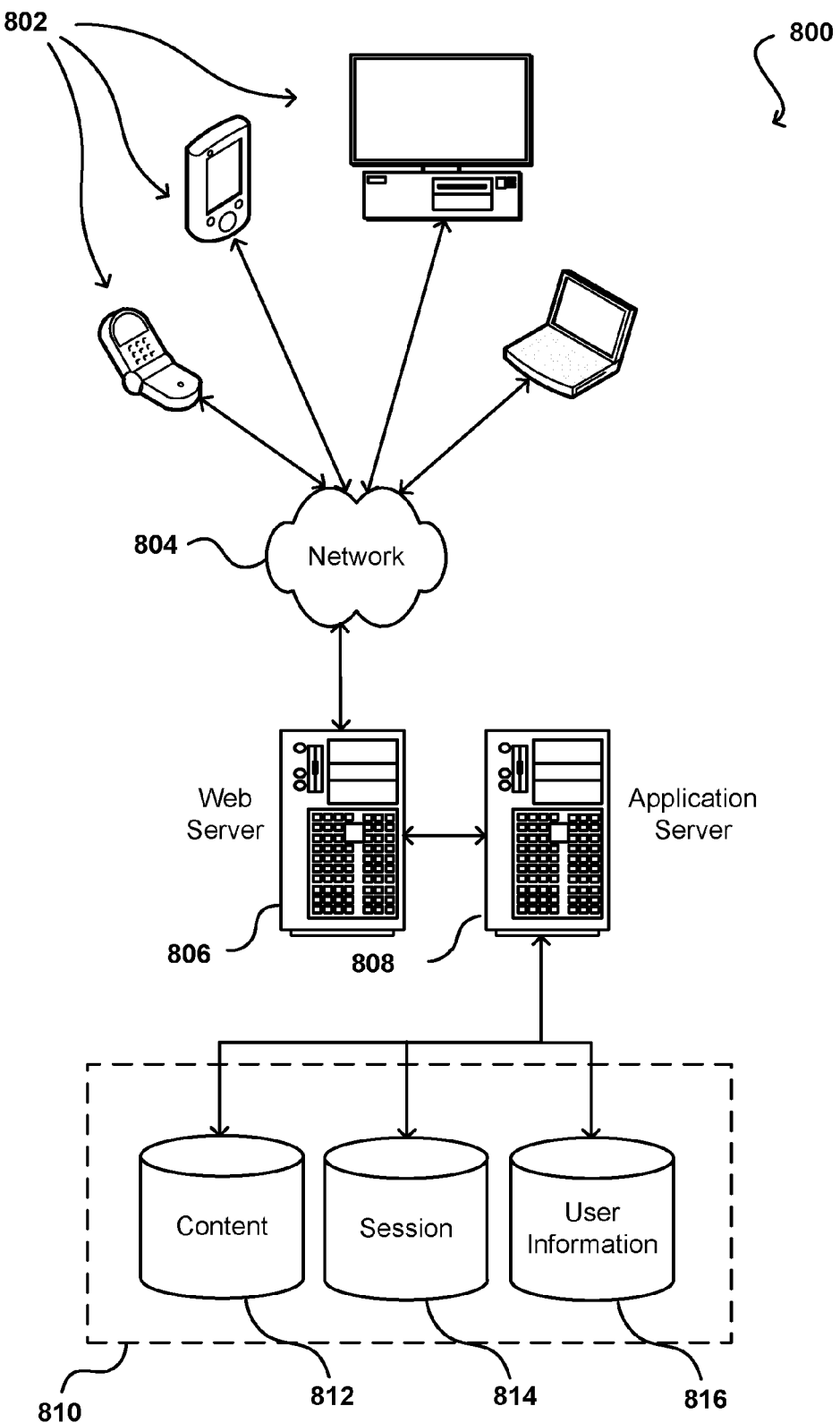
FIG. 8 illustrates an example environment in which various aspects of the various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining an object identifier for an object of digital content, the object of digital content being associated with a customer account of a content provider;
   determining a type of access authorized for the customer account for the object of digital content;
   generating a barcode that includes identifying information corresponding to the object identifier, the type of access authorized, and the customer account;
   causing the barcode to be sent to a recipient customer account associated with an intended recipient; and
   revoking, in response to sending the barcode to the recipient customer account, access to the object of digital content by the customer account and modifying the type of access authorized for the customer account,
   wherein a recipient computing device of the intended recipient analyzes the barcode to obtain a copy of the object of digital content from the content provider, and wherein, in response to analyzing the barcode by the recipient computing device, the type of access authorized for the customer account is transferred to an account of the intended recipient.

2. The computer-implemented method of claim 1, further comprising compensating the customer account.

3. The computer-implemented method of claim 2, wherein the compensation is received from one of the intended recipient or the content provider.

4. The computer-implemented method of claim 1, further comprising:
   displaying the barcode on a display screen of a computing device associated with the customer account, wherein the recipient computing device is operable to capture an image of the barcode and analyze the barcode to obtain the copy of the object of digital content.

5. The computer-implemented method of claim 1, wherein the object of digital content comprises at least one of an electronic book, an audio file, a video file, a multimedia file, a virtual good, and a text-based object.

6. The computer-implemented method of claim 1, wherein the barcode is further capable of including information identifying at least one portion or location of interest within the object of digital content, and wherein the location of interest includes one of a current page, a current audio location, a current video location, or a current game level.

7. The computer-implemented method of claim 1, wherein the recipient computing device obtains the object of digital content from at least one of a computing device associated with the customer account or the content provider.

8. The computer-implemented method of claim 1, wherein the recipient computing device utilizes the barcode to locate a physical copy corresponding to the object of digital content.

9. The computer-implemented method of claim 1, wherein generating the barcode includes generating at least one of a one-dimensional barcode or a two-dimensional barcode.

10. A computing device, comprising:
a device processor;
a memory device including instructions that, when executed by the device processor, cause the computing device to:
determine an object identifier for an object of digital content, the object of digital content being associated with a customer account of a content provider;
determine a type of access authorized for the customer account for the object of digital content;
generate a barcode that includes identifying information corresponding to the object identifier, the type of access authorized, and the customer account;
cause the barcode to be sent to a recipient customer account associated with an intended recipient; and
revoke, in response to sending the barcode to the recipient customer account, access to the object of digital content by the customer account and modify the type of access authorized for the customer account,
wherein a recipient computing device of the intended recipient analyzes the barcode to obtain a copy of the object of digital content from the content provider, and wherein, in response to analyzing the barcode by the recipient computing device, the type of access authorized for the customer account is transferred to an account of the intended recipient.

11. The computing device of claim 10, wherein the instructions, when executed further enable the computing device to compensate the customer account, wherein the compensation is received from one of the intended recipient or the content provider.

12. The computing device of claim 10, wherein the instructions, when executed further enable the computing device to:
display the barcode on a display screen of a computing device associated with the customer account, wherein the recipient computing device is operable to capture an image of the barcode and analyze the barcode to obtain the copy of the object of digital content.

13. The computing device of claim 10, wherein the instructions, when executed further enable the computing device to:
detect the recipient computing device within a predetermined distance a computing device associated with the customer account; and
send the barcode to the recipient computing device.

14. The computing device of claim 10, wherein a license comprises an expiration for the type of access, a scope of access to an amount of information of the object of digital content, or permissions associated with the object of digital content.

15. The computing device of claim 10, wherein the instructions, when executed further enable the computing device to:
in response to associating the copy of the object of digital content with the account of the intended recipient, providing information for items related to the object of digital content to intended recipient account.

16. A non-transitory computer readable storage medium storing one or more sequences of instructions executable by one or more processors to perform a set of operations comprising:
determining an object identifier for an object of digital content, the object of digital content being associated with a customer account of a content provider;
determining a type of access authorized for the customer account for the object of digital content;
generating a barcode that includes identifying information corresponding to the object identifier, the type of access authorized, and the customer account;
causing the barcode to be sent to a recipient customer account associated with an intended recipient; and
revoking, in response to sending the barcode to the recipient customer account, access to the object of digital content by the customer account and modifying the type of access authorized for the customer account,
wherein a recipient computing device of the intended recipient analyzes the barcode to obtain a copy of the object of digital content from the content provider, and wherein, in response to analyzing the barcode by the recipient computing device, the type of access authorized for the customer account is transferred to an account of the intended recipient.

17. The non-transitory computer readable storage medium of claim 16, further comprising instructions executed by the one or more processors to perform the set of operations of:
compensating the customer account, wherein the compensation is received from one of the intended recipient or the content provider.

18. The non-transitory computer readable storage medium of claim 16, further comprising instructions executed by the one or more processors to perform the set of operations of:
displaying the barcode on a display screen of a computing device associated with the customer account, wherein the recipient computing device is operable to capture an image of the barcode and analyze the barcode to obtain the copy of the object of digital content.

19. The non-transitory computer readable storage medium of claim 16, further comprising instructions executed by the one or more processors to perform the set of operations of:
detecting the recipient computing device within a predetermined distance a computing device associated with the customer account; and
sending the barcode to the recipient computing device.

20. The non-transitory computer readable storage medium of claim 16, further comprising instructions executed by the one or more processors to perform the set of operations of:
in response to associating the copy of the object of digital content with the account of the intended recipient, provide information for items related to the object of digital content to intended recipient account.

* * * * *